United States Patent
Arce et al.

(10) Patent No.: US 10,089,508 B2
(45) Date of Patent: Oct. 2, 2018

(54) SYSTEM AND METHOD OF EMBEDDING A TWO DIMENSIONAL CODE WITH CONCEALED SECURE MESSAGE

(71) Applicants: Gonzalo R. Arce, Newark, DE (US); Gonzalo Garateguy, Framingham, MA (US); Sean Xiaolu Wang, Wilmington, DE (US)

(72) Inventors: Gonzalo R. Arce, Newark, DE (US); Gonzalo Garateguy, Framingham, MA (US); Sean Xiaolu Wang, Wilmington, DE (US)

(73) Assignee: Graphiclead LLC, Newark, DE (US)

( * ) Notice: Subject to any disclaimer, the term of this patent is extended or adjusted under 35 U.S.C. 154(b) by 164 days.

(21) Appl. No.: 15/168,677

(22) Filed: May 31, 2016

(65) Prior Publication Data

US 2017/0243041 A1    Aug. 24, 2017

Related U.S. Application Data

(60) Provisional application No. 62/167,558, filed on May 28, 2015.

(51) Int. Cl.
*G06K 9/18* (2006.01)
*G06K 7/10* (2006.01)
*G06K 19/06* (2006.01)

(52) U.S. Cl.
CPC ..... *G06K 7/1099* (2013.01); *G06K 19/06037* (2013.01); *G06K 19/06056* (2013.01)

(58) Field of Classification Search
CPC .. G06K 7/1439; G06K 7/1417; G06K 7/1447; G06K 19/06046; G06K 19/06103; G06K 19/06112; G06K 19/0614
See application file for complete search history.

(56) References Cited

U.S. PATENT DOCUMENTS

7,950,589 B2 * 5/2011 Oouchi .................. G06F 11/08
                                                                        235/462.1
8,144,922 B2    3/2012 Kawabe et al.
(Continued)

*Primary Examiner* — Thien M Le
*Assistant Examiner* — April Taylor (57) ABSTRACT

The present invention embodies a technique to embed a graphic representation and/or a concealed message such as but not limited to two dimensional codes such as quick response (QR) code matrices, fingerprints, coded fingerprint representations, iris imagery, iris coded representation, biometric hashes, palm print or portraits into a QR matrix code. In the case where biometric data such as finger print representation, iris coded representation or biometric hashes are encoded into the embedding, suitable binary representation of those patterns are generated before encoding. These concealed messages can be further encrypted using any cryptographic method such as public or private key or other suitable encrypting mechanisms adapted to the concealed message. For an implementation of the present invention in which a graphic representation is embedded into the code, the embedding process is based on an optimization method by which the color or luminance of the embedding is modified so as to minimize the visual distortion with respect to a reference image while maintaining the probability of decoding error of the standard and concealed code under a predetermined limit.

35 Claims, 3 Drawing Sheets

(56) References Cited

U.S. PATENT DOCUMENTS

| | | | | |
|---|---|---|---|---|
| RE44,139 E | * | 4/2013 | Cheong | G06T 9/00 |
| | | | | 235/494 |
| 8,851,392 B2 | | 10/2014 | Shinotami et al. | |
| 8,948,445 B2 | * | 2/2015 | Mow | G06T 1/0021 |
| | | | | 382/100 |
| 9,697,447 B2 | * | 7/2017 | Schory | G06K 19/06103 |
| 2010/0195834 A1 | * | 8/2010 | Amagai | H04N 1/32133 |
| | | | | 380/277 |
| 2013/0021364 A1 | * | 1/2013 | Azuma | G06K 19/06103 |
| | | | | 345/589 |
| 2013/0026241 A1 | | 1/2013 | Sakahashi et al. | |
| 2013/0112760 A1 | | 5/2013 | Schory et al. | |
| 2014/0119647 A1 | * | 5/2014 | Cheong | G06K 9/18 |
| | | | | 382/166 |
| 2014/0144996 A1 | | 5/2014 | Friedman et al. | |
| 2014/0263666 A1 | * | 9/2014 | Prince | G06K 19/06037 |
| | | | | 235/494 |
| 2015/0324946 A1 | | 11/2015 | Arce et al. | |
| 2016/0342875 A1 | * | 11/2016 | Annamalai | G06K 19/06103 |
| 2017/0357884 A1 | * | 12/2017 | Friedman | G06K 19/06037 |

* cited by examiner

SYSTEM AND METHOD OF EMBEDDING A TWO DIMENSIONAL CODE WITH CONCEALED SECURE MESSAGE

REFERENCE TO RELATED APPLICATION

This application claims inventions which were disclosed in Provisional Patent Application Number 62/167,558, filed May 28, 2015, entitled "SYSTEM AND METHOD OF EMBEDDING A TWO DIMENSIONAL CODE WITH CONCEALED SECURE MESSAGE". The benefit under 35 USC § 119(e) of the above mentioned United States Provisional Application is hereby claimed, and the aforementioned application is hereby incorporated herein by reference.

FIELD OF THE INVENTION

This invention relates to a technique to embed a graphic representation and/or a concealed message into a quick response (QR) matrix code.

BACKGROUND OF THE INVENTION

Quick Response (QR) code is a type of matrix barcode (or two-dimensional barcode), which is a machine-readable optical label that contains information about the item to which it is attached. Applications of QR code include product tracking, item identification, time tracking, document management, and general marketing.

U.S. Pat. No. 8,144,922 to Kawabe Discloses a method in which a two-dimensional code that represents information by means of a cell dot distribution pattern, formed by having a plurality of colored cells and a logo mark, are superimposed.

U.S. Pat. No. 8,851,392 to Shinotami Discloses an apparatus comprising display control unit which displays image-added two-dimensional codes in which a two-dimensional code presenting given information is superimposed on a first given image to show at least a portion of the two-dimensional code within a region where the first given image is shown US Patent 2013/0112760 to Schory Discloses Systems and methods for the automated generation of QR codes with embedded images therein are provided. The QR code has an active, machine-readable portion and a background portion. An example system comprises an image identification module to identify a human-readable image.

US Patent 2013/0026241 to Sakahashi Discloses a sevice, and a system, applications and an associated Ecosystem for the consistent and reliable production, creation, generation, management and utilization of two-dimensional ('2D') barcodes ('Codes') featuring embedded Images, designating the alignment position and alignment size of the embedding Images in 2D Codes and enabling the corresponding outputted Code files by the Device System to be downloaded and or showcased digitally US Patent 2014/0144996 to Friedman Discloses A method of generating a readable matrix code image encoding a message based on an input image and a readable matrix coding specification, comprising: calculating function areas readable to comply with a function patterns specification; determining an extent of free cells and derived cells according to a code word specification; calculating decode input values for free cells such that the appearance of the free cells compared to respective areas of the input image complies with a visual perceptual similarity criterion.

SUMMARY OF THE INVENTION

The present invention embodies a technique to embed a graphic representation and/or a concealed message such as but not limited to two dimensional codes such as quick response (QR) code matrices, fingerprints, coded fingerprint representations, iris imagery, iris coded representation, biometric hashes, palm print or portraits into a QR matrix code. In the case where biometric data such as finger print representation, iris coded representation or biometric hashes are encoded into the embedding, suitable binary representation of those patterns are generated before encoding. These concealed messages can be further encrypted using any cryptographic method such as public or private key or other suitable encrypting mechanisms adapted to the concealed message. For an implementation of the present invention in which a graphic representation is embedded into the code, the embedding process is based on an optimization method by which the color or luminance of the embedding is modified so as to minimize the visual distortion with respect to a reference image while maintaining the probability of decoding error of the standard and concealed code under a predetermined limit.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

The present system and method according to the subject embodies a technique to embed a graphic representation and/or a concealed message such as but not limited to 2 dimensional codes such as QR code matrices, fingerprints, coded fingerprint representations, iris imagery, iris coded representation, biometric hashes, palm print or portraits into a QR matrix code. In the case where biometric data such as finger print representation, iris coded representation or biometric hashes are encoded into the embedding, suitable binary representation of those patterns are generated before encoding. These concealed messages can be further encrypted using any cryptographic method such as public or private key or other suitable encrypting mechanisms adapted to the concealed message.

For an implementation of the present method in which a graphic representation is embedded into the code, the embedding process is based on an optimization method by which the color or luminance of the embedding is modified so as to minimize the visual distortion with respect to a reference image while maintaining the probability of decoding error of the standard and concealed code under a predetermined limit.

The generated image can be displayed on a display unit such as a LED displays, LCD display, E-Ink (electrophoretic ink), backlit displays, or light boxes.

Encoding Process

Figure 1:
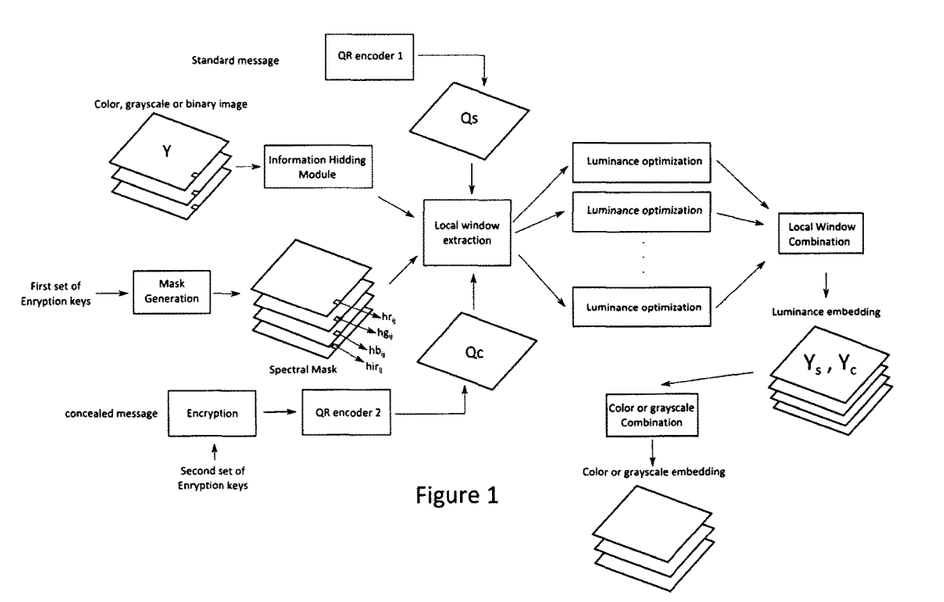
FIG. 1 shows an example of the embedding process in which a standard and concealed messages and an image representation is embedded.

The encoding process takes as inputs concealed and standard messages used to calculate a standard QR code and a second concealed code which can be a QR code, other type of matrix code or an unstructured set of information bits super imposed over the structure of the standard QR code. The concealed message can be encrypted or unencrypted using a set of cryptographic keys. In addition to the concealed message an image representation which can be color, grayscale or binary can be also embedded into the code. This graphic representation can contain further concealed information embedded using a transformation technique such as but not limited to watermarking. The concealed message can be encoded in the embedding by means of a spectral weighting mask which is derived from another set of cryptographic keys. The image observed by the concealed QR decoder is a linear combination of the decoding masks and the different spectral layers of the captured image. These layers can include the Red, Green and Blue channels as well as other spectral channels such as but no limited to the near Infrared, short wave infrared and ultra violet bands. An example of this embedding process in which a standard and concealed messages and an image representation is embedded is depicted in FIG. 1.

In this example the pixel luminance of concealed and standard embedded codes are calculated as a function of the corresponding QR code values, the intensity values of the input graphic representation Y (i, j) and the spectral masks. Some of the pixels of the embedded code are replaced by pixels of the image and the remaining pixels are modified according to their location with respect to the corresponding QR code module. The luminance of the standard embedding can be expressed as $$Y_s(i, j) = \begin{cases} \beta & \text{if } (i, j) \text{ is modified and } Q_s(i, j) = 1 \\ \alpha & \text{if } (i, j) \text{ is modified and } Q_s(i, j) = 0 \\ \beta_s & \text{if } (i, j) \text{ is a center pixel and } Q_s(i, j) = 1 \\ \alpha_s & \text{if } (i, j) \text{ is a center pixel and } Q_s(i, j) = 0 \\ Y(i, j) & \text{otherwise} \end{cases}$$

and the luminance of the concealed embedded code is given by $$Y_c(i, j) = \begin{cases} \gamma & \text{if } (i, j) \text{ is modified and } Q_c(i, j) = 1 \\ \delta & \text{if } (i, j) \text{ is modified and } Q_c(i, j) = 0 \\ \beta_c & \text{if } (i, j) \text{ is a center pixel and } Q_c(i, j) = 1 \\ \alpha_c & \text{if } (i, j) \text{ is a center pixel and } Q_c(i, j) = 0 \\ Y(i, j)h(i, j) & \text{otherwise} \end{cases}$$

where h(i, j) is generated independently from the first set of cryptographic keys provided. The eight luminance levels are optimized independently for each local window as wells as the location of center and modified pixels and then combined to generate the final embedding.

Figure 2:
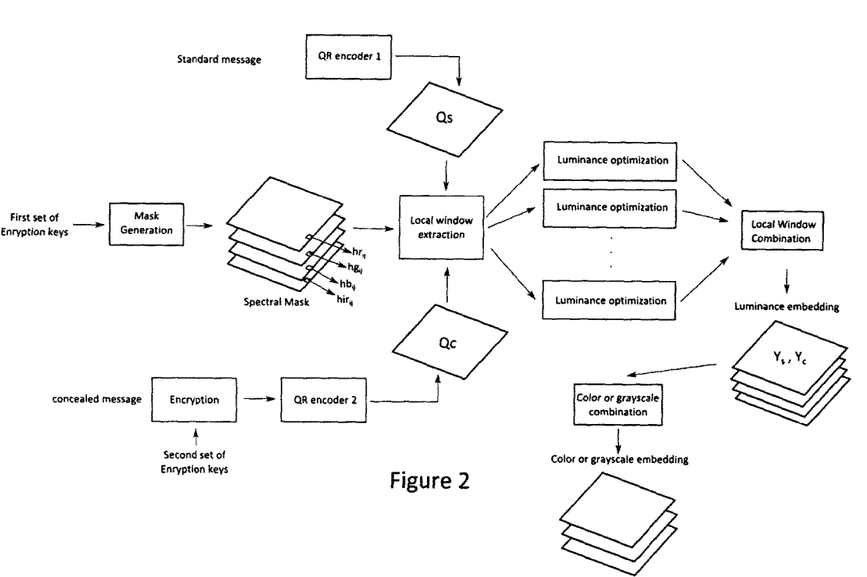
FIG. 2 shows another example of the embedding process in which no image representation is provided.

In another example of the present system where no image representation is provided as depicted in FIG. 2, the QR embedding takes one uniform luminance value or color for all the pixels of each QR code cell. The concealed and standard QR codes are divided into local windows and for each local window the luminance of the concealed embedding $Y_c$ and standard $Y_s$ luminance images are modified to take two possible values depending on the corresponding values of the concealed code Qc and standard code Qs as follows $$Y_c(i, j) = \begin{cases} \alpha_c & \text{if } Qc(i, j) = 0 \\ \beta_c & \text{if } Qc(i, j) = 1 \end{cases}$$

$$Y_s(i, j) = \begin{cases} \alpha_s & \text{if } Qs(i, j) = 0 \\ \beta_c & \text{if } Qs(i, j) = 1 \end{cases}$$

The four luminance parameters $\alpha_s, \beta_s, \alpha_c, \beta_c$ are obtained as the result of and optimization process which is performed independently for each local window and in the end the values are combined to generate the QR embedding containing both concealed and standard messages.

In yet another example of the present system where no image representation is provided, a concealed bit string is embedded into sub cells of the standard QR code where all colors in the sub cell provide approximately the same gray scale luminance. These sub cells when multiplied by the different spectral masks provide different information bits effectively increasing the bit capacity of the concealed embedding. In an extension of this example the concealed code is encoded in sub cells of the standard QR code cell, each one taking a different uniform color.

In yet another example of the present system, the graphic image matrix is divided into a set of image sequences which are generated through a two dimensional micro lens array or micro-diffractive optic element or digital optical elements (DOE) array or holographic elements, where the generated embedding is on a set of lenticular image sequences.

These concealed messages can be further encrypted using any cryptographic method such as public or private key or other suitable encrypting mechanisms adapted to the concealed message. For example, the encryption may use a public key cryptography to produce the cypher text to be embedded in the QR code and a private key can be used to extract the biometric bit sequences. Any of a number of public key encryption systems may be used such as pretty good privacy (PGP) systems. The symmetric or public key can be configured to randomly select the color/grayscale space dimensions on a pixel by pixel, or group of pixels by group of pixels basis, so that the secure bit string sequence is embedded into a subspace of the ultraviolet, visible, and infrared spectral bands such as, but not limited to RGB, NIR, SWIR UV, CYM or CMYK color spaces.

A reader camera equipped with a specially designed optic spectral filter may be employed to implement the functions of block certain optical spectra designed in coordination with the initial coding process so that it can de-mask and reveal hidden information. In addition, an illumination or excitation energy source may be employed to cause the changes of specific spectra in all/part of the spatial locations on the code. Such illumination or excitation energy sources can be any electromagnetic energy sources within any band of electromagnetic spectrum such as Gamma-ray, x-ray, UV/VIS/NIR/IR, microwave, millimeter waves or other types of energy sources such as acoustic wave, etc. The spectra changes may be caused by various energy conversion mechanisms, such as x-ray fluorescent effect, fluorescent effect, Raman effect, wavelength up-conversion, multi-photon emission effect, other non-linear effect such as second harmonic generation (SHG). It is also possible that different codes are detected and decoded at the different time of a day where the QR code is under the illumination of the natural sun light during the day and artificial light during the night.

Probability of Detection Error

In the first example of the system where an image representation is incorporated into the QR embedding, the probability of error model is also calculated by considering the probabilities that a particular element is classified as the opposite of its correct value in the corresponding QR code (Standard or concealed)

$$P_{Qs_{err}} = P(Y_s(i,j) < t_s(i,j)|Qs(i,j)=0)P(Qs(i,j)=0) + P(Y_s(i,j) > t_s(i,j)|Qs(i,j)=1)P(Qs(i,j)=1)$$

$$P_{Qc_{err}} = P(Y_c(i,j) < t_c(i,j)|Qc(i,j)=0)P(Qc(i,j)=0) + P(Y_c(i,j) > t_c(i,j)|Qc(i,j)=1)P(Qc(i,j)=1)$$

where the binarization thresholds $t_s(i,j)$ and the $t_c(i,j)$ are a function of the set of luminance parameters $\beta, \alpha, \beta_s, \alpha_s$ and the image intensity $Y(i,j)$ for the case of the standard code and a function of $\gamma, \delta, \beta_c, \alpha_c$ and the spectral masks $h(i,j)$ for the concealed code.

Other models are also possible considering different binarization methods or an ensemble of methods in such a way that the model approximates the response of a set of different decoders.

In a second example of the system the values of $\alpha_s, \alpha_s, \alpha_c, \beta_c$ are optimized for each local window in order to minimize the probability of detection error for both the concealed and the standard QR code detection defined as $$P_{Qs_{err}} = P(Y_s(i,j) < t_s(i,j)|Qs(i,j)=0)P(Qs(i,j)=0) + P(Y_s(i,j) > t_s(i,j)|Qs(i,j)=1)P(Qs(i,j)=1)$$

$$P_{Qc_{err}} = P(Y_c(i,j) < t_c(i,j)|Qc(i,j)=0)P(Qc(i,j)=0) + P(Y_c(i,j) > t_c(i,j)|Qc(i,j)=1)P(Qc(i,j)=1)$$

In an example of a QR decoder implementation the binarization threshold $t(i,j)$ is calculated as the average of the luminance of the embedding inside the window as $$t_s(i,j) = \frac{1}{N} \sum_{(i,j) \in W} Y_s(i,j)$$

$$t_c(i,j) = \frac{1}{N} \sum_{(i,j) \in W} Y_c(i,j)$$

Different models can be assumed for the probability distribution of the threshold depending on the concentration of QR modules and the type of detector used to acquire the images. In an example it can be assumed that the thresholds have a Gaussian distribution with mean $$\mu_c = \frac{\alpha_c n_{\alpha_c} + \beta_c n_{\beta_c}}{N} \text{ and } \mu_s = \frac{\alpha_s n_{\alpha_s} + \beta_s n_{\beta_s}}{N}$$

corresponding to the concealed and standard image respectively. The values of $n_{\alpha_c}, n_{\gamma_c}, n_{\alpha_s}, n_{\beta_s}$ correspond to the number of pixels in the window with corresponding values in the QR codes $Qs(i,j)=0, Qs(i,j)=1, Qc(i,j)=0$ and $Qc(i,j)=1$ respectively. The standard deviation $\sigma$ of each threshold corresponds to the noise at the detector, yielding the model for the probability of error given by $$P_{Qc_{err}} = \Phi\left(\frac{\alpha_c - \mu_c}{\sigma}\right) p_0^c - \Phi\left(\frac{\beta_c - \mu_c}{\sigma}\right) p_1^c + p_1^c \text{ and}$$

$$P_{Qc_{err}} = \Phi\left(\frac{\alpha_s - \mu_s}{\sigma}\right) p_0^s - \Phi\left(\frac{\beta_s - \mu_s}{\sigma}\right) p_1^s + p_1^s$$

where $$p_1^s = \frac{n_{\beta_s}}{N}, \ p_0^s = \frac{n_{\alpha_s}}{N}, \ p_1^c = \frac{n_{\alpha_c}}{N}, \ p_1^c = \frac{n_{\beta_c}}{N}$$

are the probability of having a QR module with value 0 or 1 inside the local window.

Luminance Optimization Process

In the case where no image representation is provided and the embedding is generated in color, the optimization of the luminance parameters of $\alpha_s \beta_s \alpha_c \beta_c$ is formulated as $$(\alpha_s, \beta_s, \alpha_c, \beta_c) = \min_{\alpha_s \beta_s \alpha_c \beta_c, r, g, b} J(r, g, b)$$

subject to 
$$P_{Qs_{err}}(\alpha_c \beta_c) \leq P_{max}$$
$$P_{Qc_{err}}(\alpha_c \beta_c) \leq P_{max}$$
$$g(\alpha_s \beta_s \alpha_c \beta_c, r, g, b) = 0$$

Where $J(r, g, b)$ is distance metric between the colors corresponding to all possible combinations of QR code values. The colors corresponding to each combination [Qs(i,j)=0, Qc(i,j)=1], [Qs(i,j)=1, Qc(i,j)=0], [Qs(i,j)=1, Qc(i,j)=1], [Qs(i,j)=0, Qc(i,j)=1 are denoted as $(r_{00}, g_{00}, b_{00})$, $(r_{01}, g_{01}, b_{01})$, $(r_{10}, g_{10}, b_{10})$, $(r_{11}, g_{11}, b_{11})$ respectively, and the cost function to be optimized is defined as $$J(\alpha_s \beta_s \alpha_c \beta_c) = \frac{1}{\|(r_{00}, g_{00}, b_{00}) - (r_{10}, g_{10}, b_{10})\|^2} + \frac{1}{\|(r_{01}, g_{01}, b_{01}) - (r_{11}, g_{11}, b_{11})\|^2} + \frac{1}{\|(r_{00}, g_{00}, b_{00}) - (r_{01}, g_{01}, b_{01})\|^2} + \frac{1}{\|(r_{10}, g_{10}, b_{10}) - (r_{11}, g_{11}, b_{11})\|^2}$$

The equality constraint in the optimization problem, $g(\alpha_s \beta_s \alpha_c \beta_c, h_r, h_g, h_b) = 0$ enforces the relation between the color components of the embedding and the intensity images $Y_c$ and $Y_s$. This relationship involves the Spectral mask calculated from the first set of cryptographic keys and the standard weight used to calculated the intensity image at a standard detector.

In another example where an image representation is provided as an input the optimization problem can be defined as $$\min_{\substack{\beta, \alpha, \beta_s, \alpha_s \\ \gamma, \delta, \beta_c, \alpha_c}} J(\beta, \alpha, \beta_s, \alpha_s, \gamma, \delta, \beta_c, \alpha_c)$$

subject to 
$$P_{Qs_{err}}(\beta, \alpha, \beta_s, \alpha_s) \leq P_{max}$$
$$P_{Qc_{err}}(\gamma, \delta, \beta_c, \alpha_c) \leq P_{max}$$
$$g(\alpha_s \beta_s \alpha_c \beta_c, r, g, b) = 0$$

where $g(\alpha_s\beta_s\alpha_c\beta_c, r, g, b)=0$ is an inequality constraint which relates the modified luminace of concealed and standard QR embedding embedding to the final color of the embedded pixel.

The cost function in this case measures the visual distortion between the standard image embedding and the image representation. Some examples of possible metrics that can be used are, the filtered mean square error between the intensity values of the embedded image and the original image $$J = \frac{1}{N}\|h*(Y_s - Y)\|$$

Another example is the combination of the filtered mean square error and the mean Structural Similarity Metric (MSSIM) defined by Wang et al. in "Image quality assessment: From error visibility to structural similarity," IEEE Transactions on Image Processing, vol. 13, no. 4, pp. 600-612, Apr. 2004, which is hereby incorporated herein by reference.

$$J = \frac{1}{2}(1 - MSSIM(Y_s, Y)) + \frac{1}{N}\|h*(Y_s - Y)\|$$

In these two cases h is a filter modeling the low pass characteristics of the human visual system. The reference image Y in this case can be the original graphic representation or the output of the information hiding module after embeds additional information into the image itself by methods such as but not limited to watermarking.

As one exemplary application of the present invention, the embedded code can be in the form of an erasable tattoo on human skin. The tattoo is invisible to human eye or camera. It is only revealed when it is illuminated with a NIR laser light, it will emit visible spectrum via optical up-conversion which can be sensed by naked eye or standard camera by placing a NIR blocking filter. It has many utilities such as for patient and medical treatment ID for preventing treatment error.

Decoding Process

Figure 3:
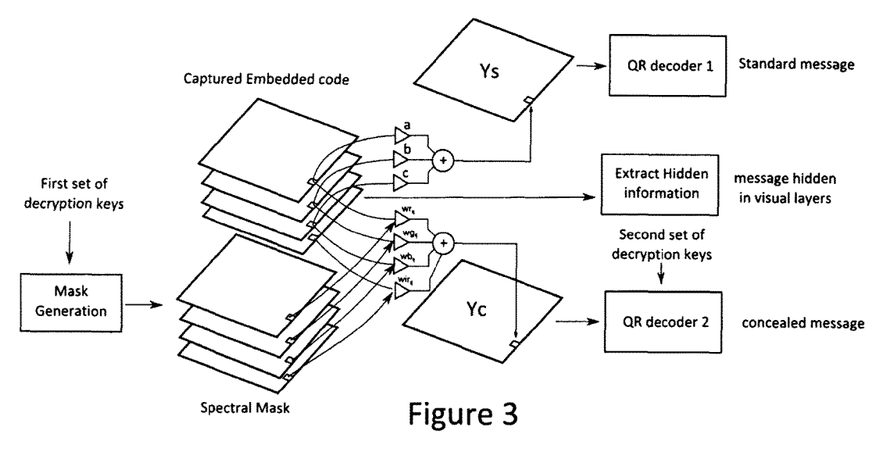
FIG. 3 shows an example of the decoding process.

The decoding process is illustrated in FIG. 3. Standard and concealed QR codes are obtained based on individual pixels or groups of pixels from the color or grayscale layers of the embedding. In an example of this process the concealed QR code image denoted by Yc and represented as an intensity matrix is obtained as a linear combination of the spectral layers of the captured embedding such as Red, Green and Blue or Near Infrared. The standard QR code image is denoted by Ys and is calculated from the red, green and blue component of the captured image by means of the standard luminance weights denoted as (a,b,c). The set of linear coefficients denoted as $\{wr_{ij}, wg_{ij}, wb_{ij}, wir_{ij} \ldots \}$ used to calculate concealed QR code image Yc can be generated using a set of decryption keys.

After generating the two QR code images standard or modified QR decoders recover the standard or concealed message. The concealed message can be encrypted or unencrypted. For the case where the concealed message is encrypted a second set of decryption keys is required for its decryption. If additional information was hidden in the visual layers of the embedding by means of watermarking or other embedding process, this information is recovered from the captured embedded code at this stage.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for generating an embedded image comprising a first two dimensional Quick Response (QR) code and a second two dimensional QR code, the method comprising the steps of:
   a) Obtaining by a processor, a graphic image wherein the graphic image is represented as a matrix with M rows and N columns of pixels;
   b) Obtaining the first two dimensional QR code represented as a matrix with M rows and N columns of pixels, generated from a public message;
   c) Obtaining the second two dimensional QR code represented as a matrix with M rows and N columns of pixels, generated from a concealed message;
   d) Obtaining a spectral mask represented as a set of matrices with M rows and N columns of pixels;
   e) Obtaining a luminance of the graphic image represented as a luminance matrix with M rows and N columns of pixels which carries information of the brightness of the graphic image;
   f) Subdividing the M by N graphic image matrix into sub-blocks of m rows and n columns of pixels wherein m is less than M and n is less than N;
   g) Subdividing the first two dimensional QR code into sub-blocks of m rows and n columns wherein each sub-block corresponds to a sub-block of the graphic image;
   h) Subdividing the second two dimensional QR code into sub-blocks of m rows and n columns wherein each sub-block corresponds to a sub-block of the graphic mage;
   i) Subdividing the set of matrices of the spectral mask into sub-blocks of m by n pixels wherein each sub-block corresponds to a sub-block of the graphic image;
   j) Subdividing the M by N luminance matrix into sub-blocks of m rows and n columns of pixels wherein each sub-block corresponds to a sub-block of the graphic image;
   k) Identifying pixels in the graphic image suitable for luminance modification depending on the first and second two dimensional QR codes; and
   l) Determining an optimal luminance value for the pixels identified in step (k) in accordance to a cost function and modifying the luminance of the pixels in accordance to the optimal luminance value to generate the embedded image.

2. The method of claim 1, wherein the step of identifying the pixels in the graphic image suitable for luminance modification comprises:

a) Obtaining a first set of center pixels on corresponding sub-blocks obtained from the first and second two dimensional QR codes and the graphic image; and b) Obtaining a second set of non-central pixels suitable for luminance modification on corresponding sub-blocks by applying a filtering operation on the sub-blocks obtained from the first and second two dimensional QR codes and the graphic image.

3. The method of claim 2, wherein the luminance of the embedded image is the multiplication of a color image by a subset of the spectral mask.

4. The method of claim 3, wherein the luminance values of the embedded image are selected to minimize the difference with respect to the second two dimensional QR code, and the first two dimensional QR code respectively.

5. The method of claim 1, wherein the cost function in step (1) calculates a distortion in the luminance of the embedded image with respect to the luminance of the graphic image.

6. The method of claim 1, wherein the concealed message in the second two dimensional QR code is a set of bit sequences representing but not limited to biometric features comprising fingerprints, coded fingerprint representations, iris imagery, iris coded representation, biometric hashes, palm print, and portraits.

7. The method of claim 6, wherein a public key cryptography scheme is used to produce an encrypted message to be embedded in the second two dimensional QR code and wherein a private key is used to extract the biometric bit sequences.

8. The method of claim 6, wherein multiple cryptography schemes including but not limited to pretty good privacy (PGP) schemes are used to prevent third-parties from reading the concealed message.

9. The method of claim 6, wherein the embedded image is in the form of an erasable tattoo on human skin, wherein the tattoo is invisible to human eye or camera and is only revealed when illuminated with a near infrared (NIR) light.

10. The method of claim 1, wherein the embedded image comprises different spectral bands including but not limited to red, green, blue, cyan, magenta, yellow, near infrared, short wave infrared, and ultraviolet.

11. The method of claim 10, wherein a set of symmetric or public keys is configured to randomly select a subset of spectral bands on a pixel by pixel, or group of pixels by group of pixels basis, so that the concealed message is embedded into a subspace of the ultraviolet, visible, and infrared spectral bands comprising RGB, NIR, SWIR, UV, YUV, XYZ, Lab, CYM or CMYK color spaces.

12. The method of claim 10, wherein the concealed message is encoded by means of a spectral weighting mask which is derived from a set of cryptographic keys.

13. The method of claim 1, wherein the concealed message in the second two dimensional QR code is encrypted using a cryptographic method including but not limited to symmetric, public or private keys which prevent third-parties from reading the concealed message.

14. The method of claim 1, wherein the second two dimensional QR code is replaced by other types of matrix code or an unstructured set of information bits.

15. The method of claim 1, wherein the first two dimensional QR code is replaced by other types of matrix code or an unstructured set of information bits.

16. A system for encoding data into a graphic image, the system comprising:
a) A data storage;
b) At least one user interface element; and c) Network interface and a processor coupled to the data storage, the at least one user interface element and the network interface, wherein the processor is programmed with machine readable instruction for controlling the system to perform functions, including functions to:
i) Receive via the at least one user interface element, the graphic image represented as a matrix with M rows and N columns;
ii) Receive via the at least one user interface element, data in a message for encoding;
iii) Generate a first and a second Quick Response (QR) codes from the data wherein the QR code is represented as a matrix with M rows and N columns and wherein each element of the matrix is one of two unique values;
iv) Generate the second QR code using public key cryptography to produce cypher text to be embedded in the first QR code;
v) Retrieve a biometric or secure bit strings to be embedded in the second QR code;
vi) Select pixels to be modified in the first and second QR codes;
vii) Optimize luminance of selected pixels and return a set of optimal luminance values;
viii) Generate an embedded image represented as a matrix with M rows and N columns where each of its elements has a value defined as function of a spectral mask and the optimal luminance values; and
ix) Display the generated embedded image on a display unit comprising an LED display, an LCD display, E-Ink (electrophoretic ink), a backlit display, or a light box.

17. The system of claim 16, further comprising a reader camera equipped with specially designed optic spectral filters implementing the functions of:
a) Blocking certain optical spectra designed in coordination with an initial coding process so that the reader camera can de-mask and reveal hidden information.

18. The system of claim 17, further comprising an illumination or excitation energy source which causes changes of specific spectra in all or part of the spatial locations on the embedded image.

19. The system of claim 18, wherein the illumination or excitation energy source is within any band of electromagnetic spectrum including but not limited to Gamma-ray, x-ray, UV/VIS/NIR/IR, microwave, millimeter waves.

20. The system of claim 18, whereas the spectra changes is caused by various energy conversion mechanisms, including but not limited to x-ray fluorescent effect, fluorescent effect, Raman effect, wavelength up-conversion, multi-photon emission effect, other non-linear effect such as second harmonic generation (SHG).

21. The system of claim 18, wherein the first and the second QR codes are detected and decoded at a different time of a day wherein the first and the second QR codes are under an illumination of the natural sun light during the day and artificial light during the night.

22. The system of claim 16, wherein the graphic image matrix is divided into a set of image sequences which are generated through a two dimensional micro lens array or micro-diffractive optic element or digital optical elements (DOE) array or holographic elements.

23. The system of claim 16, wherein the generated embedded image is on a set of lenticular image sequences.

24. The system of claim 16, wherein the embedded image is on a sequence of standard QR codes displayed on monitors, LED displays, LCD displays, E-Ink (electrophoretic ink), backlit displays, or light boxes.

25. The system method of claim 16, wherein the second two dimensional QR code is replaced by other types of matrix code or an unstructured set of information bits.

26. The system of claim 16, wherein the first two dimensional QR code is replaced by other types of matrix code or an unstructured set of information bits.

27. A method for generating an embedded image comprising a first two dimensional Quick Response (QR) code and a second two dimensional QR code, the method comprising the steps of:
   a) Obtaining the first two dimensional QR code represented as a matrix with M rows and N columns of pixels, generated from a public message;
   b) Obtaining the second two dimensional QR code represented as a matrix with M rows and N columns of pixels, generated from a concealed message;
   c) Obtaining a spectral mask represented as a set of matrices with M rows and N columns of pixels;
   d) Subdividing the first two dimensional QR code into sub-blocks of m rows and n columns wherein m is less than M and n is less than N;
   e) Subdividing the second two dimensional QR code into sub-blocks of m rows and n columns wherein each sub-block corresponds to a sub-block of the first two dimensional QR code;
   f) Subdividing the set of matrices of the spectral mask into sub-blocks of m by n pixels wherein each sub-block corresponds to a sub-block of the first two dimensional QR code;
   g) Determining an optimal luminance value or color for each sub-block in accordance to a cost function and the values of the first and second two dimensional QR code and using the optimal luminance value or color to generate the embedded image.

28. The method of claim 27, wherein the cost function in step (g) calculates a color difference between a fixed set of colors corresponding to all possible combinations of the two possible pixel values in the first and second two dimensional QR codes.

29. The method of claim 28, wherein the concealed message is encoded in a graphic image where an encrypted bit string is generated from the graphic image and embedded into a subset of pixels within each of the first two dimensional QR code's cells which are each of the black and white squares of the QR code so as to increase the capacity of the concealed message embedded.

30. The method of claim 29, wherein the encrypted bit string is encoded into a subset of pixels within a QR code cell, providing similar gray scale luminance to the first two dimensional QR code.

31. The method of claim 27, wherein the second two dimensional QR code is replaced by other types of matrix code or an unstructured set of information bits.

32. The method of claim 27, wherein the concealed message in the second two dimensional QR code is encrypted using a cryptographic method including but not limited to symmetric, public or private keys which prevent third-parties from reading the concealed message.

33. The method of claim 27, wherein the embedded image comprises different spectral bands including but not limited to red, green, blue, cyan, magenta, yellow, near infrared, short wave infrared, and ultraviolet.

34. The method of claim 33, wherein the concealed message is encoded by means of a spectral weighting mask which is derived from a set of cryptographic keys.

35. The method of claim 27, wherein the first two dimensional QR code is replaced by other types of matrix code, including colored and picture-embedding 2D barcodes which are different from standard black and white barcodes.

* * * * *